United States Patent [19]
Haruta et al.

[11] 3,773,609
[45] Nov. 20, 1973

[54] PROCESS FOR PREPARING FILM OF CRYSTALLINE PROPYLENE POLYMER HAVING GOOD HEAT SEALABILITY AT LOW TEMPERATURE

[75] Inventors: Hiroshi Haruta; Masaaki Muraki; Tadao Ishibashi; Fumihiko Mushiaki, all of Chibaken, Japan

[73] Assignee: Chisso Corporation, Osaka, Japan

[22] Filed: Sept. 9, 1971

[21] Appl. No.: 179,018

[30] Foreign Application Priority Data
Sept. 19, 1970  Japan.............................. 45/82218
Dec. 25, 1970  Japan............................ 45/124036

[52] U.S. Cl.......... 161/182, 117/93.1 CD, 156/229, 156/244, 156/272, 156/281, 264/289, 161/402
[51] Int. Cl.............................................. B29b 3/02
[58] Field of Search.................... 156/272, 229, 281, 156/244; 117/93.1 CD, 47; 264/289; 161/182, 402

[56] References Cited
UNITED STATES PATENTS
3,666,836  5/1972  John............................. 264/289 X
3,666,834  5/1972  Bullard.......................... 264/289 X
3,639,134  2/1972  Stegmeier................ 117/93.1 CD X
3,503,842  3/1970  Kahn................................... 161/162
3,526,583  9/1970  Harward............................. 204/165

Primary Examiner—Edward G. Whitby
Attorney—Fred C. Philpitt

[57] ABSTRACT

A film having a good heat sealability at a low temperature is prepared by biaxially stretching a film comprising a composition consisting of 95 to 60 percent by weight of crystalline propylene polymer and 5 to 40 percent by weight of an alicyclic resin having a softening point of 85° to 140°C and a bromine value of not more than 14, prepared by hydrogenation of an aromatic hydrocarbon resin, and then subjecting at least one side of the film to an oxidation treatment. Said composition can contain inorganic fillers such as silica, calcium carbonate, etc. and/or a bisamide, and the heat sealability at a low temperature of the thus obtained film can be maintained, and an antiblocking property is endowed to the film thereby.

12 Claims, 3 Drawing Figures

PROCESS FOR PREPARING FILM OF CRYSTALLINE PROPYLENE POLYMER HAVING GOOD HEAT SEALABILITY AT LOW TEMPERATURE

This invention relates to a process for preparing a transparent, biaxially stretched film of crystalline propylene polymer having a good heat sealability at a low temperature.

The biaxially stretched film of crystalline propylene polymer film has very good mechanical, lustrous or protective properties, but has such a disadvantage that the film undergoes considerable heat shrinkage when heated at the heat sealing, and the heat shrinkage has been a great obstacle in practical application of the film. Thus, many studies and researches have been so far made to improve the disadvantage. For example, there have been known a process based on coating of a readily heat-sealable substance as described in Japanese Pat. publication Nos. 3991/69 and 32320/69 and a process based on use of a blend of polypropylene and hydrogenated hydrocarbon polymers as described in Japanese Pat. publication No. 7958/66. However, in the former process, the coating is carried out after a substrate film is molded, and therefore the process itself becomes very costly, and on the other hand, the transparency of the film is usually lowered and the appearance of the film is disadvantageously impaired. The latter process is useful, but the merely biaxially stretched film of a blend consisting of polypropylene and hydrogenated hydrocarbon polymers usually has a poor heat seal strength.

On the other hand, there is also well known a process for improving a printability and an adhesiveness of a plastic film towards other material at laminating, coating, etc., by applying a corona discharge treatment to the plastic film to oxidize the surface of the film, as disclosed in Japanese Pat. publication Nos. 9411/56 and 18239/63. In the plastic film to which the corona discharge treatment has been merely applied, the adhesiveness of the film towards other material is considerably effectively increased, but when the two films are placed upon one another and heat sealed, the heat seal strength is liable to be lowered, because the surfaces of the films have been oxidized. That is, it is impossible in said prior art process to endow a heat sealability at a low temperature even in the case of the biaxially stretched film.

According to the present invention, a transparent, stretched film of crystalline propylene polymer, which can be readily heat sealed by means of the ordinary heat sealer without any heat shrinkage, can be prepared by melting a composition consisting of 95 to 60 percent by weight of crystalline propylene polymer and 5 to 40 percent by weight of an alicyclic resin having a softening point of 85° to 140°C (according to ring and ball method) and a bromine value of not more than 14, extruding the molten composition into a sheet or film, (which will be hereinafter simply referred to as "extruded into a sheet"), cooling the resulting sheet to solidify the same, stretching the sheet in at least one direction, and applying a corona discharge treatment to the sheet.

As the crystalline propylene polymer of the present invention, it is preferable to use a crystalline polypropylene, a crystalline copolymer comprising propylene as a principal component and other α-olefins or a mixture thereof, which contains 80 percent or more of insoluble portion in boiling n-hexane and has an intrinsic viscosity [η] of 1.5 to 4.0 measured at 135°C in tetralin. A crystalline propylene polymer having 90 percent or more of insoluble portion in boiling n-hexane and an intrinsic viscosity [η] of 2.0 to 3.5 measured at 135°C in tetralin is particularly preferable in the present invention.

The above-mentioned alicyclic resin refers to those obtained by hydrogenating an aromatic hydrocarbon resin having a degree of polymerization of 2 to 7, which is obtained by polymerizing reactive, unsaturated hydrocarbons containing as a main component, an aromatic hydrocarbon having reactive double bonds mainly at the side chains, until the unsaturated bonds including the double bonds in the aromatic rings have been almost completely saturated.

Said aromatic hydrocarbons having reactive double bonds mainly at the side chains include the aromatic hydrocarbons having reaction double bonds at the side chains and the aromatic hydrocarbons having reactive double bonds in the condensed rings. Examples thereof are vinyltoluene, vinylxylene, propenylbenzene, styrene, α-methylstyrene, indene, methylindene, ethylindene, etc. These aromatic hydrocarbons having the reactive double bonds at the side chains can be used alone or in a mixture of at least two of these aromatic hydrocarbons.

An industrially most advantageous source of supply of these aromatic hydrocarbons having the reactive double bonds at the side chains is a fraction having a boiling point range of 20° to 300°C, preferably 140° to 300°C, of a residue separated from thermal cracking products of heavy petroleum fractions by distilling off useful olefins such as ethylene, propylene, etc. The fraction contains, in addition to the aromatic hydrocarbons having the reactive double bonds at the side chains, reactive unsaturated hydrocarbons such as butene, pentene, butadiene, cyclopentadiene, etc., but it is desirable that there exist the aromatic hydrocarbons having the reactive double bonds at the side chains in such an amount in the reactive unsaturated hydrocarbon mixture that 50 percent by weight or more, preferably 70 percent by weight or more of the aromatic hydrocarbons having the reactive double bonds at the side chains may enter into the polymer.

As a polymerization catalyst for said reactive unsaturated hydrocarbons, sulfuric acid, phosphoric acid or amphoteric metal chlorides such as aluminum chloride, zinc chloride, etc. can be illustrated.

The thus obtained aromatic hydrocarbon resin must be hydrogenated until the unsaturated bonds including the double bonds in the aromatic rings have been almost completely saturated. As the hydrogenating conditions, it is necessary to use a large amount of a highly activated catalyst such as a Raney nickel or palladium (2 to 20 percent by weight of the catalyst per the weight of the resin) and to hydrogenate the resin at such a high temperature as 250° to 300°C for at least 2 hours under a hydrogen pressure of at least 150 kg/cm$^2$. The hydrogenation of the double bonds in the aromatic rings can be confirmed by infra-red absorption spectra or ultraviolet absorption spectra of the resin before the hydrogenation and after the hydrogenation. That is to say, the aromatic hydrocarbon resin has specific absorptions of aromatic rings at 700 cm$^{-1}$ and 750 cm$^{-1}$ by the infrared absorption spectra and 261.5 mμ and 274.5 mμ by ultraviolet absorption spectra, but said specific absorptions are reduced as the aromatic rings are converted to the alicyclic rings by hydrogenation, and disappear when the rings have been saturated. It is desirable in the present invention that the aromatic rings have a percentage of disappearance of the specific absorptions of 80 percent or more or preferably 90 percent or more.

To obtain an alicyclic resin, a severe hydrogenating condition is applied in the present invention. Therefore, there is such a fear that the depolymerization of the aromatic resin to be hydrogenated takes place and consequently lower molecular substances are formed. Thus, it is desirable to remove the lower molecular substances by a suitable means, for example, a vacuum distillation method or a fractional precipitation method, after the hydrogenation.

Heretofore, a method for measuring the degree of unsaturation of the resin, etc. based on iodine value or bromine value as a scale is an ordinary expedient, but the unsaturated bonds in the aromatic rings of the aromatic hydrocarbon resin cannot be measured according to said method. In the case of the aromatic hydrocarbon resin used in the present invention, the unsaturated bonds on the aromatic rings are hard to be hydrogenated only by hydrogenating the resin to lower the iodine value or bromine value according to the conventional method. The resins whose unsaturated bonds on the aromatic rings are not sufficiently hydrogenated have a poor compatibility with the crystalline propylene polymer and undesirably lower the transparency and surface gloss of the polymer.

The alicyclic resin has a softening point of 85° to 140°C, preferably 100° to 135°C (according to the ring and ball method) and a bromine value of not more than 14, preferably not more than 10. When the softening point of the resin is less than 85°C, the finally obtained film undergoes remarkable blocking, and the heat seal strength at a low temperature is lowered. When the softening point exceeds 140°C, the heat strength at a low temperature of the finally obtained film is lowered. Therefore, the softening point beyond a range of 85° to 140°C is not preferable. When the bromine value of the resin exceeds 14, the compatibility of the resin with the crystalline propylene polymer is lowered, and the transparency of the finally obtained film is undesirably lowered. When the bromine value of the resin is between 10 and 14, the film comprising a composition consisting of the resin and the crystalline propylene polymer shows a white turbidity when it is not oriented, but to a great surprise, the film turns transparent and is endowed with a sufficient heat seal strength at a low temperature when biaxially stretched and treated by corona discharge. It is particularly desirable that the resin has a bromine value of not more than 10. Five to 40 percent by weight of the resin is added to the crystalline propylene polymer, based on the total weight of the composition. When less than 5 percent by weight of the resin is added to the crystalline propylene polymer, the finally obtained film will have an insufficient heat seal strength. When more than 40 percent by weight of the resin is added to the crystalline polymer, the blocking of the film becomes remarkable, and consequently this is not practically desirable. It is desirable in view of the heat seal strength at a low temperature and blocking prevention to add 7 to 20 percent by weight, preferably 8 to 15 percent by weight of the resin to the crystalline propylene polymer. As a representative, commercially available product of the alicyclic resin, "Arkon-P" (a trade mark of the product made by Arakawa Forest Chemical Industries, Ltd. Japan) can be illustrated.

The crystalline propylene polymer and the alicyclic resin can be mixed by the well known means, for example, a roll mixer, a banbury mixer or an extruder. A very homogeneous mixture can be readily obtained according to any of these means.

The mixture is extruded into a sheet from a die of a suitable extruder at an extrusion temperature of not more than 320°C, preferably 200° to 300°C, and cooled and solidified. When said extrusion temperature exceeds 320°C, bubbles are generated and considerable fuming appears owing to thermal decomposition of the alicyclic resin mixed with the propylene polymer, and this is not preferable also in view of the heat seal strength and blocking prevention of the finally obtained film.

Stretching of the film can be carried out at any stretching temperature for the ordinary crystalline propylene polymer. It is preferable in view of the film preparation to make 2 to 10-fold stretching at 90° to 140°C in the case of uniaxial stretching and make 2 to 8-fold stretching at 130° to 165°C in the case of biaxial stretching. It is more prferable that the stretching ratio is at least 4 in any of the longitudinal and lateral directions, and the ratio of the longitudinal stretching to the lateral stretching is 0.5 to 1.5. It is much more preferable that the ratio of the longitudinal stretching to the lateral stretching is 0.7 to 1.3. When any of the longitudinal stretching ratio and the lateral stretching ratio is at least 4, the finally obtained film can have a sufficiently good heat seal strength at a low temperature. When the ratio of the longitudinal stretching to the lateral stretching is less than 0.5, the heat seal strength is low when the film is heat sealed in parallel to the lateral direction. When the ratio of the longitudinal stretching to the lateral stretching exceeds 1.5, the heat seal strength of the film is low in the longitudinal direction. That is to say, when the ratio of the longitudinal stretching to the lateral stretching is within a range of from 0.5 to 1.5, the direction property of the heat seal strength at a low temperature is small, and a sufficiently high heat seal strength at a low temperature can be obtained in both longitudinal and lateral directions. Thus, the finally obtained film can be practically used for packaging bags. The term "a ratio of the longitudinal stretching to the lateral stretching" used herein means a ratio of a stretching ratio in a longitudinal direction to a stretching ratio in a lateral direction of a film.

The biaxial stretching of the present invention can be carried out by a sequential biaxially stretching method such as a stenter system usually employed, or by a simultaneous biaxially stretching method such as a tubular system, or by a multi-stage stretching method. It is desirable to employ the sequential biaxially stretching method such as the stenter system and stretch a film at a stretching ratio as high as possible, preferably 5 to 7-fold, by the first stage stretching (usually in the longitudinal direction) and then stretch the film at a stretching ratio up to about 5 to 9 fold by the second stage stretching (usually in the lateral direction).

To prevent heat shrinkage at the heat sealing, it is preferable to carry out heat treatment of the stretched film. The heat treatment of the film is carried out at 120° to 170°C from under tension to under a state of several percent relaxation.

The thus obtained stretched film is not sufficient in the heat sealability at a low temperature, and cannot be utilized for a practical purpose. By applying an oxidation treatment to at least one side of the film for which the heat sealability at a low temperature is practically required, a remarkably high heat seal strength, which has not been realized at all in the conventional stretched film of propylene polymer, can be endowed thereto. Any physical or chemical surface oxidation treatment can be carried out in the present invention, but a method based on an action of high voltage stress accompanied with a corona discharge as disclosed in Japanese Pat. publication No. 9411/56 and a method based on an action of flame are preferable.

The degree of surface oxidation treatment in the present invention is such that the wetting tension determined according to the ASTM D-2578-67 method is preferably at least 35 dynes/cm, particularly preferably at least 37 dynes/cm.

When the film is immediately wound up at a high speed after the oxidation treatment, remarkable blocking takes place. Particularly when the oxidation treatment is applied to both sides of the film, vigorous blocking takes place, and it is difficult even to rewind the film. However, the blocking can be prevented by cooling the film to about 40°C or less after the oxidation treatment and then winding up the film. The film can be cooled by contacting the film with a cooling roll after the surface oxidation treatment, or blowing a cold air onto the film, or allowing the film to be cooled. It is particularly preferable, among these, to contact the film with the cooling roll.

On the other hand, it is necessary, when the film of the present invention is supplied to a user, that the film be wound up in a form of layers, but at that time, such a phenomenon that the film layers stick to each other, that is, the blocking, is liable to happen. A suitable antiblocking agent, which is miscible with the film, is an inorganic filler and/or bisamides. As the inorganic fillers there are illustrated silica, calcium carbonate, clay and talc having a mean particle size of 5 $\mu$ or less. Silica having a mean particle size of 0.01 to 3 $\mu$ and calcium carbonate having a mean particle size of 0.3 to 3 $\mu$ are particularly preferable. As the bisamides, there are illustrated methylenebisstearamide, ethylenebisstearamide, phenylenebisstearamide, ethylenebisoleamide, ethylenebisbutyramide, methylenebiserucamide, etc. Among these, ethylenebisstearamide is particularly desirable. Said antiblocking agents can be used alone or in a mixture thereof, but 0.02 to 0.70 percent by weight, particularly preferably 0.04 to 0.50 percent by weight of the anti-blocking agent is added to the composition of the propylene polymer and the resin on the basis of the total weight of the composition. When more than 0.7 percent by weight of the anti-blocking agent is added thereto, the transparency of the film is considerably lowered, and such is not preferable. When less than 0.02 percent by weight of the anti-blocking agent is added thereto, the anti-blocking property of the film is not sufficient.

The present film can contain, in addition to said antiblocking agent, an antioxidant, an ultraviolet absorber and a coloring agent, if necessary.

It is not preferable to mix an anti-static agent, which is usually mixed with the crystalline polypropylene, with the present film at the ordinary mixing ratio, because the anti-static agent remarkably lowers the heat seal strength at a low temperature of the film.

According to the present invention, a film having a heat seal strength of 100 g/15 mm or higher, when the film is heat sealed at a temperature of 135°C under a load of 1 kg/cm$^2$ for 1 second, can be obtained. The present film has a heat sealability equal or superior to that of the biaxially stretched film coated with a commercially available substance which is readily heat sealable at a low temperature, and can be readily heat sealed by means of the ordinary heat sealer for polyethylene film without any heat shrinkage. The film obtained by adding said antiblocking agent thereto has a good heat sealability at a low temperature and a good transparency (the haze value is less than 2,0, usually less than 1.0), and also has a good anti-blocking property (blocking degree is 500 or less). Therefore, the film can be readily rewound, printed or prepared into bags, and is very useful as a transparent packaging film.

Now, the present invention will be explained in detail, referring to the accompanying drawings and examples, but the present invention is not limited thereto.

Characteristic values in the drawings and examples are measured according to the following procedures:

1. Young's modulus is determined according to ASTM D 882.
2. Haze value is determined according to ASTM D 1003-52.
3. Wetting tension is determined according to ASTM D 2578-67.
4. Heat seal strength is a peeling resistance (unit: g/15 mm) determined by bonding two strips of film, each having a width of 15 mm, over the entire width at a predetermined temperature under a load of 2 kg/cm$^2$ by means of a bar-type heat sealer for 3 seconds and making T-type peeling at an angle of peeling of 180° and a peeling speed of 200 mm/min. in a direction of width of the bonded part in the case of FIG. 1 and Example 1, or by bonding two strips of film, each having a width of 15 mm, over the entire width at a predetermined temperature under a load of 1 kg/cm$^2$ by the bar-type heat sealer for one second and making T-type peeling at an angle of peeling of 180° and a peeling speed of 300 mm/min. in a direction of width of the bonded part in the case of FIG. 2 and Examples 2 and so forth.
5. Blocking degree is determined by placing reactangular samples of 2 cm × 10 cm upon one another by a length of 2 cm, leaving the resultant samples standing at a temperature of 40°C, under a load of 1 kg/cm$^2$, in an atmosphere of a relative humidity of 65°C % for 24 hours, and then measuring a maximum force (unit: g/4 cm$^2$) required for peeling the stacked portions by shearing by means of a tensile testing machine.

Figure 1:
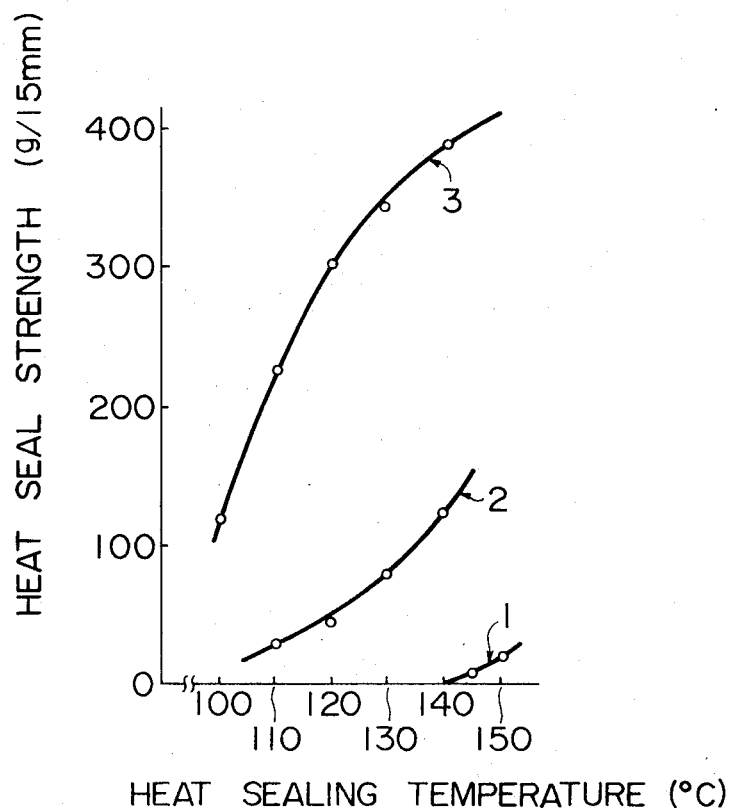
FIGS. 1 and 2 are graphs showing relationships between the heat sealing temperature and adhesiveness of the biaxially stretched films.

In FIG. 1, a graph is plotted to show a relationship between the heat sealing temperature and the heat seal strength of biaxially stretched films, where the stretching has been carried out in both longitudinal and lateral directions each to 5 times the original length at the same time. The heat sealing temperature is plotted on the axis of abscissa and the heat sealing strength on the axis of ordinate. In FIG. 1, the curve 1 is plotted for the biaxially stretched film consisting only of crystalline polypropylene; the curve 2 is plotted for the biaxially stretched film of crystalline polypropylene, to which is added 10 percent of the alicyclic resin having a softening point of 125°C, a bromine value of 6.6 and a disapearance percentage of specific absorption of aromatic ring, of about 90 percent, which is obtained by hydrogenating a petroleum resin containing about 85 percent by weight based upon the resin, of aromatic hydrocarbons having a reactive double bond at their side chain, (Arkon P-125, a trademark of a product made by Arakawa Forest Chemical Industries, Ltd., Japan); the curve 3 is plotted for a film obtained by subjecting the same film as used in the curve 2 to corona discharge treatment, so that the wetting tension may be 38 dynes/cm.

As is clear from FIG. 1, the film obtained by subjecting the biaxially stretched film consisting of the crystalline polypropylene and said alicyclic resin to corona discharge treatment (curve 3) has a remarkably increased adhesiveness, as compared with the biaxially stretched film consisting only of the crystalline polypropylene (curve 1) and the biaxially stretched film consisting of the crystalline polypropylene and said alicyclic resin (curve 2). When the biaxially stretched film consisting only of the crystalline polypropylene is subjected to corona discharge treatment, no increase in the heat seal strength is observed almost at all, as will be seen in Example 1. Therefore, it is evident that the heat seal strength can be synergistically remarkably increased by applying a surface oxidation treatment to a film containing the alicyclic resin according to the present invention.

Figure 2:
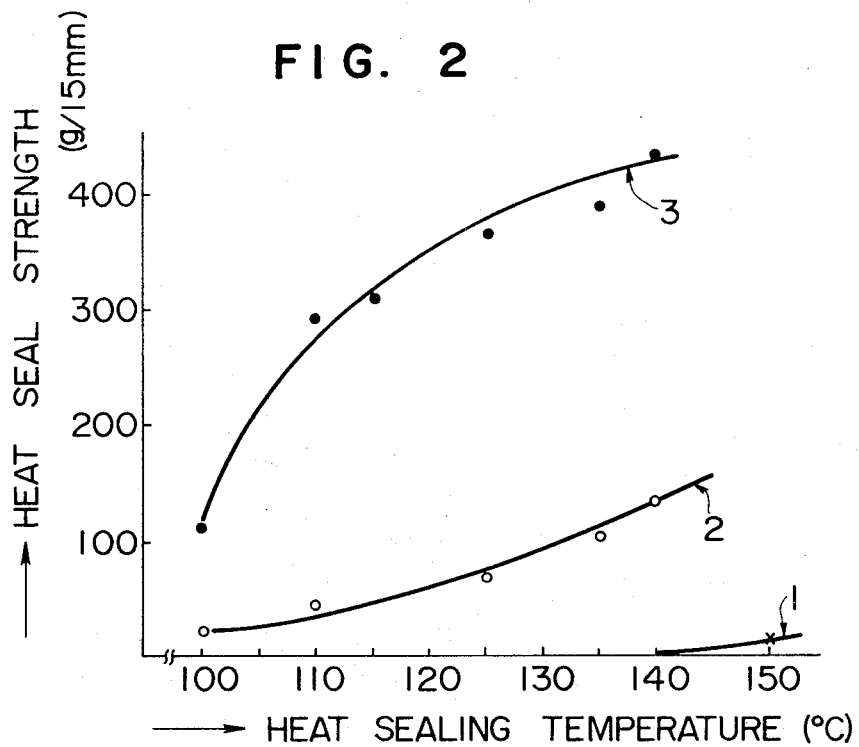

In FIG. 2, a graph is given to show relationships between the heat sealing temperature and the heat seal strength of the biaxially stretched film, which has been stretched in both longitudinal and lateral directions each to 5 times the original length at the same time. The heat sealing temperature is plotted on the axis of abscissa and the heat seal strength is plotted on the axis of ordinate. In FIG. 2, the curve 1 is plotted for the biaxially stretched film consisting only of the crystalline polypropylene; the curve 2 is plotted for the biaxially stretched film of the crystalline polypropylene, to which 10 percent of the same alicyclic resin as added to the film of the curve 2 in FIG. 1, and 0.2 percent of silica having a mean particle size of about 20 m$\mu$ are added; the curve 3 is plotted for the film obtained by subjecting the same film as used in the curve 2 in FIG. 2 to corona discharge treatment (wetting tension: 40 dynes/cm). The curve 3 is relevant to the present invention.

As is clear from FIG. 2, even the heat seal strength of the film consisting of the present mixture composition is improved, as compared with that of the film consisting only of the polypropylene, but is practically insufficient. However, it is evident that the film obtained by subjecting a film of the present mixture composition further to corona discharge treatment has a remarkably good heat seal strength.

Figure 3:
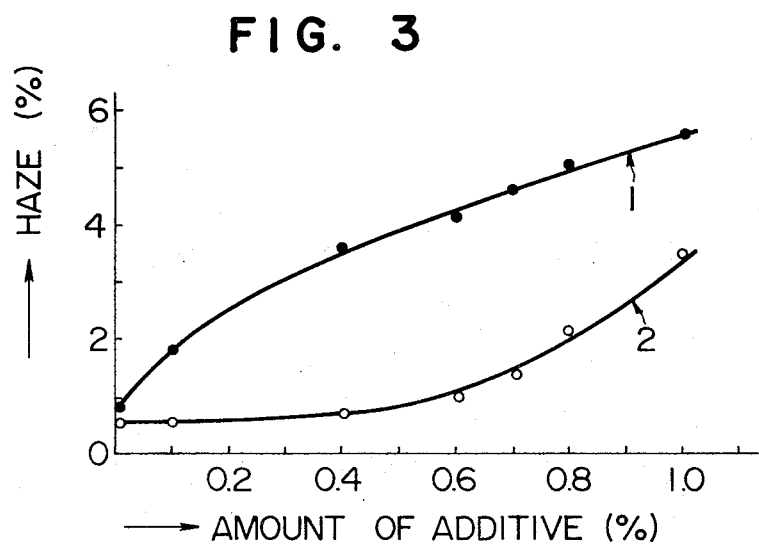
FIG. 3 is a graph showing a relationship between the amount of anti-blocking agent added to the biaxially stretched film and the haze value.

In FIG. 3, a graph is given to show relationships between the amount of an anti-blocking agent added and the haze value of the biaxially stretched film, which has been stretched in both longitudinal and lateral directions to 5 times the original length. The amount of the anti-blocking agent added is plotted on the axis of abscissa and the haze value is plotted on the axis of ordinate. In FIG. 3, the curve 1 is plotted for the biaxially stretched film prepared by adding the antiblocking agent, silica having a mean particle size of 1.2 $\mu$, to the raw material consisting only of the crystalline polypropylene; the curve 2 is plotted for the biaxially stretched film of the crystalline polypropylene containing 10 percent by weight of the same alicyclic resin as added in the case of the film of the curve 2 in FIG. 1, to which the same anti-blocking agent as added in the case of the film of the curve 1 in FIG. 3 is added.

As is clear from FIG. 3, the film prepared by adding the anti-blocking agent only to the crystalline polypropylene has such a relatively increased haze value that it cannot be practically utilized. However, if not more than 0.7 percent by weight of the anti-blocking agent is included in the present film composition, an increase in the haze value is very small, and the film can be practically utilized. In the case of the films corresponding to the curves 1 and 2 in FIG. 3, no corona discharge treatment is applied thereto, but the corona discharge treatment gives no influence upon the haze value in that case.

EXAMPLE 1

To powders of crystalline polypropylene having an intrinsic viscosity of 2.32 were added 10 percent by weight of commercially available alicyclic resin having a softening point of 125°C, a bromine value of 6.6 and a disappearance percentage of specific absorption of aromatic ring, of about 90 percent, which is obtained by hydrogenating a petroleum resin containing about 85 percent by weight based upon the resin, of aromatic hydrocarbons having a reactive double bond at their side chain ("Arkon P-125," a trademark of a product made by Arakawa Forest Chemical Industries, Ltd., Japan), based on the weight of the total resin, and further 0.2 percent by weight of commercially available phenolic stabilizer, based on the weight of the total resin. The mixture was blended in a Henschel mixer, melt-extruded at 220°C through an extruder having a screw of 90 mm in diameter, cooled and cut to obtain blend chips.

Then, the blend chips were supplied to an extruder having a screw of 200 mm in diameter, melt-extruded therefrom at 270°C, cooled and solidified, whereby a sheet having a thickness of 1,100 microns was obtained. Successively, the sheet was stretched in a longitudinal direction to 4.0 times the original length through between high temperature rolls kept at 135°C, led to a stenter type, laterally stretching machine where hot air at 160°C was circulated, and stretched in a lateral direction of the film to 8.2 times the original width. The sheet was heat treated at a temperature of 165°C and wound up, whereby a film (A) having a width of 4,000 mm and a thickness of 28 microns was obtained.

Next, a raw material consisting of crystalline polypropylene having an intrinsic viscosity of 2.32 and 0.2 percent by weight of commercially available phenolic stabilizer, based on the weight of the total raw material, was melt-extruded to a sheet having a thickness of 1,020 microns under the same conditions as above, and the resulting sheet was stretched in a longitudinal direction to 4.0 times the original length through between high temperature rolls at 140°C and successively stretched in a lateral direction of the film to 8.2 times the original width by a stenter-type, laterally stretching machine, where hot air at 165°C was circulated. The sheet was then heat treated at a temperature of 165°C, whereby a film (B) having a width of 4,000 mm and a thickness of 26 microns was obtained.

The film (A) and the film (B) were each subjected to the corona discharge treatment at a distance of 1.5 mm between the electrode and the treating rolls under an impressing power of 500 W at a speed of 6 m/min, by means of a Lepel high frequency, high voltage generator, type HFSG-2. The wetting tensions of the treated surfaces of both film (A) and film (B) are 38 dynes/cm for each. The films subjected to corona discharge treatment were disposed upon each other, so that the treated surfaces might be faced with each other, and the disposed films were heat sealed in parallel with the longitudinally stretched direction of the films at 150°C by means of a bar type heat sealer, and the heat seal strength was measured. The properties of the films (A) and (B) subjected to the corona discharge treatment are given in Table 1.

TABLE 1

| Properties | Film (A) | Film (B) |
|---|---|---|
| Young's modulus | | |
| MD[1] (kg/mm) | 256 | 194 |
| TD[2] (kg/mm) | 438 | 351 |
| Haze value (%) | 0.7 | 1.2 |
| Seal strength at 150°C (g/15 mm) | 330 | 6 |

1) MD = longitudinal direction
2) TD = lateral direction

EXAMPLE 2

A mixture of crystalline polypropylene having an intrinsic viscosity of 2.72 and 0.3 percent by weight of commercially available phenolic stabilizer, based on the weight of the mixture, and other five mixtures consisting of said mixture and an alicyclic resin having a softening point of 98°C, a bromine value of 6.2 and a disappearance percentage of specific absorption of aromatic ring, of about 90 percent, which is obtained by hydrogenating a petroleum resin containing about 85 percent by weight based upon the resin, of aromatic hydrocarbons having a reactive double bond at their side chain, which was a hydrogenated product of a petroleum resin (Arkon P-100, a trademark of a product made by Arakawa Forest Chemical Industries, Ltd., Japan), that is, total six kinds of the mixtures, were melt-extruded at 280°C by a T die through an extruder having a screw of 40 mm in diameter, respectively, and quenched by cooling rolls at 40°C, whereby sheets having a width of 200 mm and a thickness of about 800 microns were obtained. The sheets were cut to square sheets having one side length of 120 mm, preheated by an infrared heater and biaxially stretched in both longitudinal and lateral directions each to 6 times the original length at the same time by means of a pantagraph type, biaxial stretcher, where hot air at 155°C was circulated. The sheets were immediately interrupted from heating and contacted with air at 28°C under tension thereby to be fixed and cooled, whereby biaxially stretched films having a thickness of 15 microns were prepared.

Then, one surface of the each film was subjected to corona discharge treatment in the same manner as in Example 1, whereby the biaxially stretched film with a treated surface having a wetting tension of 38 dynes/cm, was obtained.

Composition of each raw material mixture and main properties of the thus obtained films are given in Table 2.

In Table 2, heat seal strength is given for two cases, that is, the films disposed upon each other so that the corona discharge-treated surfaces might be faced with each other and heat sealed, and the films disposed upon each other so that the non-treated surfaces might be faced with each other and heat sealed, for reference.

TABLE 2

| Sample No. | Content of alicyclic resin (% wt.) | Haze (%) | Young's modulus (kg/mm²) | Heat seal strength at 135°C (g/15 mm) | |
|---|---|---|---|---|---|
| | | | | treated side | non-treated side |
| 1 | 0 | 1.4 | 202 | 0 | 0 |
| 2 | 1 | 1.1 | 230 | 28 | 2 |
| 3 | 5 | 1.0 | 257 | 85 | 10 |
| 4 | 10 | 0.7 | 283 | 224 | 25 |
| 5 | 20 | 0.8 | 292 | 255 | 36 |
| 6 | 40 | 1.0 | 277 | 316 | 60 |

It is evident from Table 2 that the disadvantages of the conventional stretched film of crystalline polypropylene, that is, heat sealability, transparency, low Young's modulus, etc. could be remarkably improved.

EXAMPLE 3

To powders of crystalline polypropylene having an intrinsic viscosity of 2.56 measured in tetralin at 135°C and containing 0.3 percent by weight of a phenolic stabilizer, based on the weight of total mixture, were added 10 percent by weight of the same alicyclic resin as used in Example 1, based on the weight of total composition and 0.12 percent by weight of silica having a mean particle size of about 20 m$\mu$ ("Aerosil 200," a trademark of a product made by Nippon Aerosil Co., Ltd. Japan), based on the weight of total composition, and the resulting mixture was mixed in a Henschel mixer for 5 minutes and pelletized at 230°C. The resulting pellets were extruded onto a cooling roll at 40°C from a T-die through an extruder having a screw of 200 mm in diameter at a resin temperature of 255°C, and then the resulting sheet was stretched at 135°C in a longitudinal direction at a stretching ratio as shown in Table 3 by utilizing a difference in circumferential speed of the rolls and stretched in a lateral direction to 8 times the original width in a stenter where hot air at 160°C was circulated. The sheet was heat treated with hot air at 160°C, whereby a biaxially stretched film having different stretching ratios was obtained. Then, the film was subjected to corona discharge treatment by means of a Lepel high frequency, high voltage generator and wound up. Finally, 12 kinds of biaxially stretched films having different stretching ratios and different degrees of corona discharge treatment (wetting tensions) were obtained. The longitudinally stretching ratio, a ratio of the longitudinally stretching ratio to lateral stretching ratio, film thickness, wetting tension, haze value, and heat seal strength (135°C) of the films are given in Table 3. In Table 3, MD seal in the heat seal strength means the case that the sealing was effected in parallel with the longitudinal direction of the film, and TD seal means the case that the sealing was effected in parallel with the lateral direction of the film (the heat seal strength was measured by peeling the films in a direction perpendicular to the sealing direction).

It is seen from Table 3 that the film whose ratio of the longitudinal stretching ratio to the lateral stretching ratio is not more than 0.5 has a low heat seal strength at TD seal; the film whose wetting tension is not more than 35 dynes/cm has also a low heat seal strength; a film having a good heat sealability in both TD and MD sealing directions can be obtained at a ratio of the longitudinal stretching ratio to the lateral stretching ratio of more than 0.5 and by subjecting the film to corona discharge treatment to a wetting tension of 35 dynes/cm.

Lepel high frequency, high voltage generator, and the film was wound up, while cooling the film with cold air at 20°C. Thirteen kinds of biaxially stretched films having a thickness of about 20 $\mu$, both surfaces of each film having been subjected to the corona discharge treatment, were thereby prepared. Raw material composition, stretching ratio, wetting tension and characteristic values of the thus obtained films are given in Table 4. The crystalline propylene polymer used was a crystalline polypropylene having an intrinsic viscosity of 2.40 measured in tetralin at 135°C.

TABLE 3

| Sample Number: | Film thickness ($\mu$) | Longitudinal stretching ratio | Ratio of longitudinal stretching ratio to lateral stretching ratio | Wetting tension (dyne/cm.) | Haze (percent) | Heat seal strength (g./15 mm.) MD seal | Heat seal strength (g./15 mm.) TD seal |
|---|---|---|---|---|---|---|---|
| 1 | 30 | 1.2 | 0.15 | 39 | 1.3 | 227 | 31 |
| 2 | 30 | 2.0 | 0.25 | 39 | 1.3 | 242 | 43 |
| 3 | 30 | 3.3 | 0.41 | 39 | 0.9 | 270 | 90 |
| 4 | 30 | 4.2 | 0.52 | 33 | 0.7 | 121 | 27 |
| 5 | 30 | 4.2 | 0.52 | 39 | 0.7 | 294 | 178 |
| 6 | 25 | 5.0 | 0.62 | 39 | 0.7 | 301 | 191 |
| 7 | 25 | 6.0 | 0.75 | 33 | 0.6 | 144 | 79 |
| 8 | 25 | 6.0 | 0.75 | 37 | 0.6 | 282 | 191 |
| 9 | 25 | 6.0 | 0.75 | 39 | 0.6 | 323 | 214 |
| 10 | 25 | 6.0 | 0.75 | 42 | 0.6 | 352 | 225 |
| 11 | 22 | 6.6 | 0.82 | 36 | 0.5 | 267 | 200 |
| 12 | 22 | 6.6 | 0.82 | 40 | 0.5 | 303 | 246 |

EXAMPLE 4

Nine kinds of raw materials as shown in Table 4 were extruded from an annular die through an extruder having a screw of 65 mm in diameter and cooled, whereby unstretched tubular films were obtained. The film was passed through between a low speed nip roll and a high speed nip roll. Compressed air was introduced into the tubular film between the low speed and high speed nip rolls, while heating the film between the rolls with hot air at 165°C. A biaxially stretched tubular film having different stretching ratios was obtained by adjusting the inside pressure of the air and the circumferential speeds of the low and high speed nip rolls. The biaxially stretched tubular film was slit into two flat films. Then, the film was heat treated under tension at 140°C for 3 seconds, and cooled. Both surfaces of the film were subjected to corona discharge treatment by means of a It is seen from Table 4 that the film containing an anti-blocking agent in a range of amount described in the present invention has a very good heat sealability and anti-blocking property, and a good transparency, and a highly practical film having a high heat seal strength can be obtained when the stretching ratio is more than 4 in both longitudinal and lateral directions, and the degree of corona discharge is 35 dynes/cm or more in terms of the wetting tension.

TABLE 4

| | Raw material composition | | | Stretching ratio | | | Film characteristics | | |
|---|---|---|---|---|---|---|---|---|---|
| | Polypropylene content (percent) | Additive Name | Additive Content (percent) | Longitudinal | Lateral | Wetting tension (dyne/cm.) | Haze value (percent) | Blocking degree (g./4 cm.²) | Heat seal strength at 135° C. (g./15 mm.) |
| Sample number: | | | | | | | | | |
| 1 | 100 | — | — | 5.6 | 5.3 | 40 | 1.2 | 42 | 0 |
| 2 | 99.7 | Cyloid 244 [1] | 0.3 | 5.5 | 5.3 | 40 | 2.3 | 21 | 0 |
| 3 | 90.0 | Arkon P-125 [2] | 10.0 | 5.3 | 5.3 | 39 | 0.7 | 1274 | 263 |
| 4 | 89.7 | Cyloid 244 / Arkon P-125 | 0.3 / 10.0 | 3.5 | 3.3 | 39 | 1.1 | 598 | 128 |
| 5 | 89.7 | Cyloid 244 / Arkon P-125 | 0.3 / 10.0 | 4.5 | 4.2 | 38 | 0.8 | 266 | 206 |
| 6 | 89.7 | Cyloid 244 / Arkon P-125 | 0.3 / 10.0 | 5.9 | 5.7 | 38 | 0.8 | 217 | 314 |
| 7 | 91.7 | Alflo-H-50 [3] / Arkon P-125 | 0.3 / 8.0 | 5.7 | 5.2 | 33 | 0.7 | 222 | 82 |
| 8 | 91.7 | Alflo-H-50 / Arkon P-125 | 0.3 / 8.0 | 5.0 | 5.2 | 39 | 0.7 | 278 | 229 |
| 9 | 89.4 | Aerosil 200 [4] / Alflo-H-50 [5] / Arkon P-115 | 0.2 / 0.4 / 10.0 | 5.7 | 5.5 | 33 / 40 | 0.9 / 0.9 | 147 / 181 | 106 / 331 |
| 10 | 89.5 | Whiton SS-B [6] / Arkon P-115 | 0.5 / 10.0 | 5.5 | 5.3 | 40 | 1.2 | 177 | 342 |
| 11 | 89.0 | Aerosil 200 / Arkon P-115 | 1.0 / 10.0 | 5.2 | 5.5 | 40 | 3.1 | 124 | 318 |
| 12 | 88.0 | Alflo-H-50 / Arkon P-125 | 2.0 / 10.0 | 5.5 | 5.5 | 39 | 2.4 | 183 | 142 |

[1] Made by Fuji Davison, Ltd., Japan. Silica mean particle size 3$\mu$.
[2] Made by Arakwa Forest Chemical Industries, Ltd., Japan. Hydrogented petroleum resin having a disappearance percentage of specific absorption of aromatic ring of about 90%; softening point 123.5° C; bromine value 6.1.
[3] Made by Nihon Yushi, Ltd., Japan—ethylenebisstearamide.
[4] Made by Nihon Aerosil, Ltd., Japan. Silica mean particle size about 20 m$\mu$.
[5] Made by Arakawa Forest Chemical Ind., Ltd., Japan. Alicyclic resin having a softening point of 114.5° C. and a bromine value of 7.2 and a disappearance percentage of specific absorption of aromatic ring, of about 90%, which is obtained by hydrogenating a petroleum resin containing about 85% by weight based upon the resin, of aromatic hydrocarbons having a reactive double bond at their side chain.
[6] Made by Shiraishi Calcium, Ltd., Japan. Calcium carbonate having a mean particle size of 1.2$\mu$.

EXAMPLE 5

A mixture of crystalline polypropylene having an intrinsic viscosity of 2.31 containing 0.3 percent by weight of a phenolic stabilizer, based on the weight of the total mixture, and 0.2 percent by weight of silica having a mean particle size of about 20 m$\mu$, based on the weight of the total mixture, and other 12 mixtures consisting of said mixture and one of six kinds of additives shown in Table 5, that is, total 13 kinds of the raw material mixture were granulated at 220°C, melt-extruded from a T-die through an extruder having a screw of 40 mm in diameter at a resin temperature of 250°C, and quenched by cooling rolls at 20°C, whereby unoriented sheets having a thickness of about 700 $\mu$ were obtained. Then, the sheets were cut to square sheets having one side length of 120 mm, and the square sheets were preheated by an infrared heater, biaxially stretched in both directions each to six times the original length at the same time by a pantagraph type, biaxial stretcher, where hot air at 140°C was circulated, and heat treated at 140°C for 3 seconds, whereby biaxially stretched films having a thickness of about 25 $\mu$ were prepared. Then, the thus obtained biaxially stretched films were subjected to corona discharge treatment by a Lepel high frequency, high voltage generator, type HFSG-2, whereby 13 kinds of biaxially stretched films, one side of each thereof having been treated, were prepared.

Names and content of the additive of the samples and wetting tension and characteristic values of the films are given in Table 5. In Table 5, the blocking degree and heat seal strength are values measured for the treated surface. It is evident from the table that the film containing other resins than the alicyclic resin of the present invention has a very high haze value.

TABLE 6

| Heat seal strength (g/15 mm) | Film (C) | Film (D) |
|---|---|---|
| Back sealing | 215 | 66 |
| Bottom sealing | 242 | 92 |

EXAMPLE 7

A mixture consisting of powders of a crystalline random copolymer of ethylene-propylene having an intrinsic viscosity $[\eta]$ of 1.82 in tetralin at 135°C and 2.4 percent ethylene content (containing 0.3 percent by weight of a phenolic stabilizer, based on the weight of total mixture) and 0.2 percent by weight of silica having a mean particle size of 3 $\mu$, based on the weight of total mixture, and other seven mixtures consisting of said mixture and one of four kinds of additives as given in Table 5, that is, total eight kinds of the raw material mixtures, were granulated at 200°C, melt-extruded from a T-die through an extruder having a screw of 40 mm in diameter at a resin temperature of 220°C and quenched by cooling rolls at 20°C, whereby unoriented sheets having a thickness of about 500 $\mu$ were obtained. Then, the sheets were cut into square sheets having one side length of 120 mm. The square sheets were preheated by an infrared heater, biaxially stretched in two directions each to 5 times the original

TABLE 5

| | Additive | | | | Film characteristic value | | |
|---|---|---|---|---|---|---|---|
| Sample No. | Name | Softening point (°C.) | Bromine value | Content, percent | Wetting tension (dyne/cm.) | Haze, percent | Blocking degree (g./4 cm.²) | Heat seal strength at 120° C. (g./15 mm.) |
| 1 | Arkon P-85 [1] | 85 | 8.1 | 10 | 39 | 0.8 | 766 | 202 |
| 2 | Arkon P-100 [1] | 98 | 6.2 | 10 | 39 | 0.8 | 322 | 246 |
| 3 | Arkon P-125 | 124 | 16 | 10 | 38 | 2.1 | 191 | 293 |
| 4 | do | 123 | 12 | 10 | 38 | 1.1 | 178 | 317 |
| 5 | do | 125 | 6.6 | 5 | 39 | 1.0 | 106 | 103 |
| 6 | do | 125 | 6.6 | 8 | 38 | 0.9 | 142 | 217 |
| 7 | do | 125 | 6.6 | 12 | 38 | 0.7 | 221 | 334 |
| 8 | do | 125 | 6.6 | 18 | 38 | 0.4 | 379 | 428 |
| 9 | do | 125 | 6.6 | 25 | 36 | 0.4 | 1,044 | 392 |
| 10 | Petlite 125 [2] | 124 | 32 | 10 | 37 | 9.9 | 313 | 148 |
| 11 | Escolet 1102B [3] | 100 | 36 | 10 | 38 | 3.7 | 291 | 162 |
| 12 | Picotex 100 [4] | 100 | 1 | 10 | 38 | 4.2 | 219 | 167 |
| 13 | | | | | 40 | 20 | 36 | 0 |

[1] Made by Arakawa Forest Chemical Industries, Ltd., Japan. Alicyclic resin, each having a disappearance percentage of specific absorption of aromatic ring, of about 90%, which is obtained by hydrogenating a petroleum resin containing about 85% by weight based upon the resin, of aromatic hydrocarbons having a reactive double bond at their side chain.
[2] Made by Mikuni Jushi Kagaku Kogyo, Ltd., Japan: Petroleum resin.
[3] Dealed by Esso Standard Petroleum, Ltd., Japan: Polymer of dienic and olefinic hydrocarbons.
[4] Dealed by Esso Standard Petroleum, Ltd., Japan: α-Methylstyrene-vinyltoluene copolymer.

EXAMPLE 6

Film of Sample No. 9 of Example 3, which is referred to as Film (C), and film of Sample No. 7 of Example 3, which is referred to as Film (D), were prepared into bags by back sealing (sealing in parallel with the lateral direction of the film) at 130°C and bottom sealing (sealing in parallel with the longitudinal direction of the film) at 120°C at a rate of 30 bags/min. by means of a high speed automatic bag-making machine, type HS-300, made by Seibu Kikai Kogyo, Ltd., Japan. The heat seal strength of the thus prepared bags is given in Table 6.

length at the same time by a pantagraph type biaxial stretcher where hot air at 130°C was circulated and heat treated at 130°C under tension for 3 seconds, whereby biaxially stretched films having a thickness of about 20 $\mu$ were prepared. Then, the thus obtained biaxially stretched films were subjected to corona discharge treatment by means of a Lepel high frequency, high voltage generator, type HFSG-2, whereby eight kinds of biaxially stretched films, one surface of each thereof having been treated, were prepared. Name and content of additive of each sample, and wetting tension and characteristic values of the film are given in Table 7. In Table 7, the blocking degree and the heat seal strength are measured for the treated surface.

TABLE 7

| Sample No. | Additive Name | Amount added, percent | Wetting tension (dyne/cm.) | Haze value, percent | Blocking degree (g./4 cm.$^2$) | Heat sealing strength, 120° C. (g./15 mm.) |
|---|---|---|---|---|---|---|
| 1 | | | 38 | 2.9 | 172 | 0 |
| 2 | Arkon P-125 | 3 | 38 | 1.9 | 244 | 48 |
| 3 | do | 10 | 32 | 1.1 | 391 | 81 |
| 4 | do | 10 | 38 | 1.1 | 417 | 249 |
| 5 | do | 25 | 38 | 0.7 | 1,218 | 340 |
| 6 | Petrosin #125 [1] | 10 | 37 | 8.7 | 286 | 128 |
| 7 | Escolet 1102B | 10 | 38 | 4.3 | 303 | 106 |
| 8 | Picolastic A-75 [2] | 10 | 38 | 9.9 | 444 | 102 |

[1] Made by Mitsui Petrochemical Kogyo, Ltd., Japan: Petroleum resin (softening point: 125° C.).
[2] Dealed by Esso Standard Petroleum, Ltd., Japan: Low molecular weight polystyrene (softening point: 75° C.).

What is claimed is:

1. A process for preparing a transparent film having a good heat sealability at a low temperature, which comprises melting a mixture consisting of 95 to 60 percent by weight of crystalline propylene polymer and 5 to 40 percent by weight of an alicyclic resin having a softening point of 85° to 140°C measured by ring and ball method, a bromine value of not more than 14, extruding the melted composition into a sheet, cooling the same to solidify it, stretching the sheet at 90° to 170°C in at least one direction of the longitudinal and lateral ones, heat treating the resulting film at 120° to 170°C from under tension to under a state of several percent relaxation, and subjecting at least one surface of the film to an oxidation treatment.

2. A process according to claim 1, wherein the crystalline propylene polymer is crystalline polypropylene.

3. A process according to claim 1, wherein the alicyclic resin has a softening point of 100° to 135°C measured by ring and ball method.

4. A process according to claim 1, wherein the alicyclic resin is a resin obtained by polymerizing a fraction rich in vinyl aromatic hydrocarbon obtained by distilling petroleum cracking products, and hydrogenating the resulting resin having a polymerization degree of 2 to 7 until unsaturated bonds including double bonds in aromatic rings are almost completely saturated.

5. A process according to claim 1, wherein the composition consists of 93 to 80 percent by weight of crystalline propylene polymer and 7 to 20 percent by weight of an alicyclic resin.

6. A process according to claim 1, wherein the oxidation treatment is a corona discharge treatment.

7. A process according to claim 6, wherein the corona discharge treatment is conducted to give a wetting tension of at least 35 dynes/cm measured by ASTM D-2578-67 procedure.

8. A process according to claim 1, wherein the stretching is carried out at a stretching ratio of at least 4.

9. A process according to claim 1, wherein the stretching is carried out at a stretching ratio of at least 4, and at a ratio of the longitudinal stretching ratio to the lateral stretching ratio of 0.5 to 1.5.

10. A process for preparing a transparent film having a good heat sealability at a low temperature, which comprises melting a composition consisting of 95 to 60 percent by weight of crystalline propylene polymer and 5 to 40 percent by weight of an alicyclic resin having a softening point of 85° to 140°C measured by ring and ball method and a bromine value of not more than 14, extruding the melted composition into a sheet, cooling the same to solidify it, stretching the sheet at 90° to 170°C in at least one direction of the longitudinal and lateral ones, subjecting at least one surface of the thus obtained film to an oxidation treatment, then cooling the film to about 40°C or less, and winding up the film.

11. A biaxially stretched film having a composition consisting of 95 to 60 percent by weight of crystalline propylene polymer and 5 to 40 percent by weight of an alicyclic resin having a softening point of 90° to 140°C measured by ring and ball method and a bromine value of not more than 14, and subjected to an oxidation treatment on at least one surface thereof, and having a peeling resistance of at least 150 g/15 mm, determined by a method wherein two strips of said film each having a width of 15 mm are disposed upon each other so that the surfaces subjected to the oxidation treatment can be faced with each other; bonded over the entire width under a load of 1 kg/cm$^2$ at a temperature of 135°C for 1 second; and subjected to T-type peeling strips at a peeling speed of 300 mm/min. and an angle of peeling of 180°.

12. A process for preparing a transparent film having a good heat sealability at a low temperature, which comprises melting a composition consisting of 95 to 60 percent by weight of crystalline propylene polymer and 5 to 40 percent by weight of an alicyclic resin having a softening point of 85° to 140°C measured by ring and ball method, and a bromine value of not more than 14, said composition further containing 0.02 to 0.7 percent by weight based upon the weight of the composition, of at least one member selected from the group consisting of inorganic fillers and bisamides, extruding the melted composition into a sheet, cooling the same to solidify it, stretching the sheet at 90° to 170°C in at least one direction of the longitudinal and lateral ones, and subjecting at least one surface of the resulting film to an oxidation treatment.

* * * * *